(12) United States Patent
Barber

(10) Patent No.: US 7,042,225 B2
(45) Date of Patent: May 9, 2006

(54) APPARATUS AND METHODS FOR INDUCTION-SFL LOGGING

(75) Inventor: Thomas D. Barber, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 233 days.

(21) Appl. No.: 10/707,424

(22) Filed: Dec. 12, 2003

(65) Prior Publication Data

US 2005/0127917 A1    Jun. 16, 2005

(51) Int. Cl.
*G01V 3/28* (2006.01)
*G01V 3/20* (2006.01)

(52) U.S. Cl. ............... 324/338; 324/373; 324/366; 324/352

(58) Field of Classification Search ........... 324/338, 324/339, 351–359, 366–373
See application file for complete search history.

(56) References Cited

U.S. PATENT DOCUMENTS

| | | | |
|---|---|---|---|
| 2,582,314 A | | 1/1952 | Doll |
| 2,790,138 A | | 4/1957 | Poupon |
| 3,067,383 A | | 12/1962 | Tanguy |
| 3,179,879 A | | 4/1965 | Tanguy |
| 3,397,356 A | * | 8/1968 | Dumanoir .............. 324/352 |
| 3,882,376 A | * | 5/1975 | Schuster ................ 324/373 |
| 4,319,192 A | | 3/1982 | Chemali et al. |
| 4,471,436 A | | 9/1984 | Schaefer et al. |
| 4,513,376 A | | 4/1985 | Barber |
| 4,583,046 A | * | 4/1986 | Vinegar et al. .......... 324/373 |
| 4,584,675 A | * | 4/1986 | Peppers ................. 367/81 |
| 4,651,101 A | | 3/1987 | Barber et al. |
| 4,818,946 A | | 4/1989 | Barber |
| 4,837,517 A | * | 6/1989 | Barber .................. 324/339 |
| 4,873,488 A | * | 10/1989 | Barber et al. ........... 324/339 |
| 5,157,605 A | * | 10/1992 | Chandler et al. ......... 702/7 |
| 5,396,175 A | * | 3/1995 | Seeman ................. 324/375 |
| 5,585,727 A | * | 12/1996 | Fanini et al. ........... 324/339 |
| 5,668,475 A | * | 9/1997 | Orban et al. ........... 324/339 |

(Continued)

FOREIGN PATENT DOCUMENTS

CN    1492239    4/2004

(Continued)

OTHER PUBLICATIONS dictionary.com, definition of "about".*

(Continued)

*Primary Examiner*—Jay M. Patidar
(74) *Attorney, Agent, or Firm*—Kevin P. McEnaney; Bryan L. White; Victor H. Segura

(57) ABSTRACT

A well logging tool includes an induction array stack disposed on a mandrel; an electronic module stack disposed adjacent the induction array stack along a longitudinal axis of the well logging tool; and a shallow electrode array arranged on a housing disposed around the electronic module stack, wherein the induction array stack comprises a transmitter antenna, a first receiver antenna, and a second receiver antenna spaced apart from each other along the longitudinal axis of the well logging tool, the second receiver antenna being disposed between the transmitter antenna and the first receiver antenna.

23 Claims, 13 Drawing Sheets

U.S. PATENT DOCUMENTS

| | | | |
|---|---|---|---|
| 5,754,050 A | | 5/1998 | Smits et al. |
| 5,852,363 A | | 12/1998 | Smits |
| 5,905,379 A | * | 5/1999 | Orban et al. ............... 324/339 |
| 6,046,593 A | | 4/2000 | Eisenmann et al. |
| 6,060,886 A | * | 5/2000 | Tabarovsky et al. ........ 324/373 |
| 6,064,210 A | * | 5/2000 | Sinclair ..................... 324/369 |
| 6,353,321 B1 | * | 3/2002 | Bittar ........................ 324/338 |
| 6,369,575 B1 | | 4/2002 | Eisenmann et al. |
| 6,711,947 B1 | * | 3/2004 | Maute ..................... 73/152.29 |
| 2003/0090269 A1 | | 5/2003 | Fanini et al. |

FOREIGN PATENT DOCUMENTS

| | | | |
|---|---|---|---|
| GB | | 1189363 | 5/1967 |
| GB | | 1539222 | 12/1975 |
| GB | | 2019004 | 4/1979 |
| GB | | 2019004 A * | 10/1979 |
| WO | | WO95/03557 | 2/1995 |
| WO | | WO01/48514 | 7/2001 |

OTHER PUBLICATIONS dictionary.com, definition of "resistivity".*

* cited by examiner

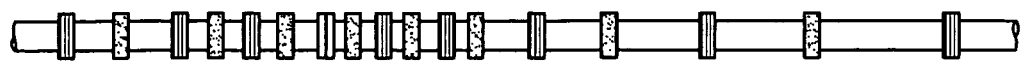
FIG.1A
(PRIOR ART)
FIG.1B
(PRIOR ART)
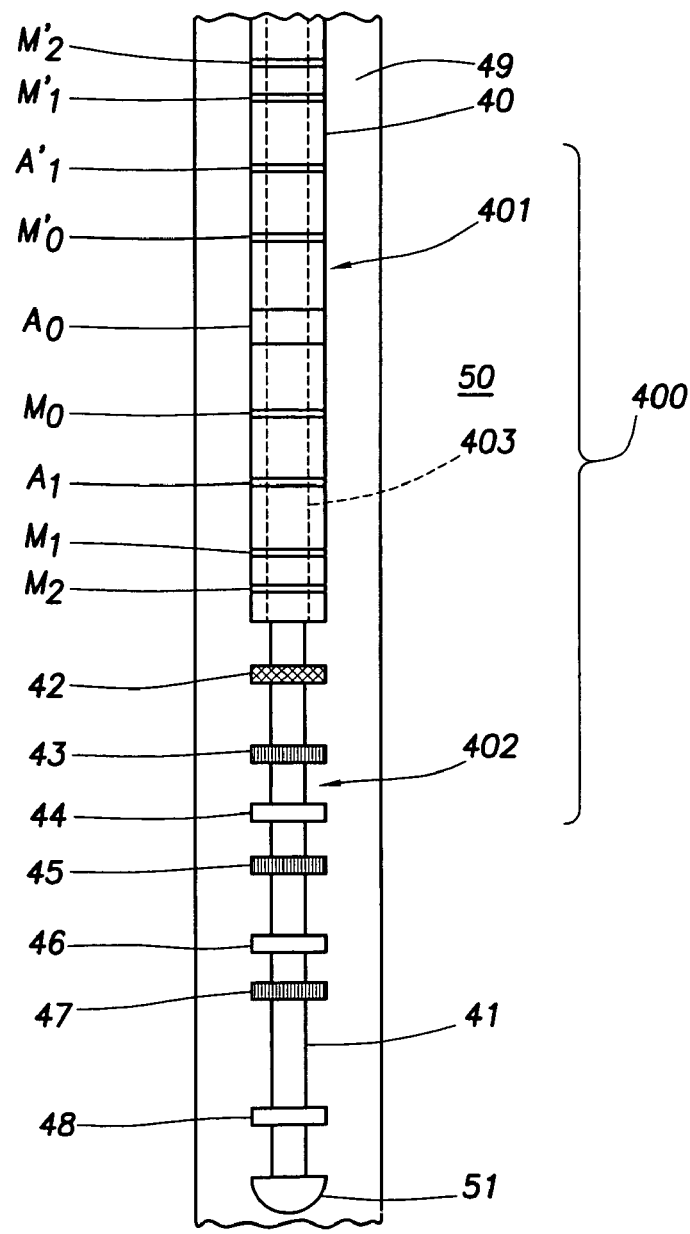
FIG.2

APPARATUS AND METHODS FOR INDUCTION-SFL LOGGING

BACKGROUND OF THE INVENTION

1. Field of the Invention

This invention relates to electrical logging apparatus and methods for determining the nature and characteristics of the various sub-surface formations penetrated by a borehole in the earth.

2. Background Art

Various resistivity logging techniques have been used to determine electrical properties of sub-surface formations. One commonly used technique is induction-SFL (spherically focused laterolog) logging. The induction component of the induction-SFL logging measures the resistivity (or its inverse, conductivity) of the formation by inducing eddy currents in the formations in response to an AC transmitter signal. The eddy currents induce secondary magnetic fields that in turn induce a voltage in a receiver antenna. Because the magnitudes of the eddy currents depend on formation conductivities, the magnitudes of the received signal thus reflect the formation conductivities. The SFL component of the induction-SFL tool measures the resistivity by injecting a current into the formation and measures the currents or voltage drop across a pair of measuring electrodes.

To obtain true formation resistivity, the log data need to be corrected for various effects that influence the measurements. For example, the resistivity measurements may have unwanted contributions from currents flowing in the sedimentation layers (beds) lying above and below the layer under investigation. This is referred to as shoulder effects, which are particularly problematic if the layer under investigation is less conductive than the adjacent beds.

To correct the shoulder effects, a sonde response function may be used to correlate the voltage measurements with true formation conductivity. This sonde response function is also known as the vertical sensitivity curve of the induction tool. For homogeneous formations, the sonde response function can best be described as a response curve, which has a main lobe of finite width and one or more sidelobes located on each side of the main lobe. These sidelobes are responsible for the shoulder effects.

Several approaches have been proposed to minimize these sidelobes (hence, the shoulder effects). For example, U.S. Pat. No. 2,582,314 issued to Doll and U.S. Pat. No. 3,067,383 issued to Tanguy disclose induction tools having multiple transmitter and receiver coils arranged in specific relationships to "focus" the sonde response function by narrowing the width of the main lobe and attenuating the sidelobes. In an alternative approach, U.S. Pat. No. 2,790,138 issued to Poupon discloses an induction logging tool having two separate induction coil arrangements, which have the same geometrical center so that responses from the two coil arrangements may be used to cancel the contributions from the sidelobes.

In addition to the shoulder effects discussed above, skin effects may also limit the ability of the induction logging equipment to accurately measure the true conductivity of the formations. The skin effect is characterized by the non-linear responses of the sonde response function as a function of the formation conductivity. The skin effect results primarily from interactions between different eddy currents flowing in adjacent loops in the formation. Prior art has shown that the magnitudes of skin effects depend on a complicated function of the coil system operating frequency, the effective length of the coil system, and the conductivity value of the adjacent formation, among other things.

To minimize the shoulder and skin effects and to design a better induction tool, various factors should be taken into account. These factors include depth of investigation (DOI), resolution, borehole effects, frequency of operation, and mutual inductance. DOI concerns how far the tool can "see" into the formation from the borehole wall. It is desirable that an induction tool is capable of a deep DOI such that the measured formation resistivity is unaffected by mud invasion. Typical invasion radii range from 0 to 4 feet, but can range up to 8 feet or more. To have a deep DOI, the transmitter-receiver spacing needs to be large. However, large transmitter-receiver spacing increases the percentage of non-linearity of the responses resulting from the skin effects. A large transmitter-receiver spacing also increases tool length and cost.

In addition to the ability to "see" deep into the formation, an induction tool should also have high resolution such that the apparent resistivity reading for the bed of interest is less affected by adjacent beds. However, to achieve a high resolution, the transmitter-receiver spacing needs to be small; this reduces the DOI of the tool. Therefore, a compromise is necessary. An alternative to a high resolution tool is to use signal processing to enhance the vertical resolution of the tool. For example, a method for enhancing the vertical resolution of an induction logging tool is disclosed in U.S. Pat. Nos. 4,818,946 and 4,837,517, both issued to Barber and assigned to the assignee of the present invention. These patents are incorporated by reference in their entirety.

An ideal tool should also have little borehole effect in holes with various diameters, e.g., ranging from 8 to 16 inches. Alternatively, if the borehole effect is non-negligible, means for borehole correction should be provided and the correction procedure should be simple. For example, the borehole correction may be achieved by including a sensor, e.g., the $R_m$ sensor on an array induction tool sold under the trade name of AIT™ by Schlumberger Technology Corporation (Houston, Tex.), that provides a measure of the borehole effects.

The operational frequency of the tool has an effect on DOIs and signal-to-noise ratios (SNR). High frequency produces low noise (i.e., better SNR). However, high frequency is more susceptible to skin effects (hence, shallower DOI). Typical prior art induction tools operate at a frequency ranging from tens of KHz to a few MHz.

Mutual inductance between the transmitter and the receiver coils can severely impact the measurable signal magnitudes. Therefore, mutual inductance should be kept as low as possible so that it will not obscure the conductivity signals from the formation. Mutual inductance can be eliminated or minimized by including a bucking coil between the transmitter and the receiver coils. The use of bucking coils in induction tools is well known in the art.

Taking these factors into account, conventional induction tools, such as that described in U.S. Pat. No. 3,179,879, have evolved to use focused multi-coil arrays for measuring resistivities at several DOI. A minimal configuration of such tools includes two coil arrays for measuring at two different DOIs: a deep array (ILD) and a medium array (ILM). The multi-coil arrays with different DOI can detect and correct for environmental effects such as borehole effects and mud invasions. For example, the ILD array is designed to see beyond the mud filtrate invaded zone.

In addition to the improvement in tool designs over the last several decades, various signal processing methods have been developed to correct for shoulder effect. Examples of these approaches include phasor processing disclosed in U.S. Pat. No. 4,513,376 issued to Barber and U.S. Pat. No. 4,471,436, issued to Schaefer et al. These patents are assigned to the assignee of the present invention, and they are incorporated by reference in their entirety.

In addition, U.S. Pat. Nos. 4,818,946 and 4,513,376 issued to Barber disclose methods of processing the induction log measurements to reduce the unwanted contributions in the log measurements by minimizing the sidelobes in the sonde response function used to translate the formation conductivity values into the processed measurements.

The efforts to improve tool accuracy have resulted in tools that include many components and circuitries. As a result, the logging tools tend to be long. For example, an induction tool described in U.S. Pat. No. 5,157,605 issued to Chandler et al. has a length of approximately forty feet (see FIG. 1A). The increased length requires more rig-up time to assemble and insert the logging tools in the wellbore and increases the need to drill more rathole (excess footage drilled below the lower most zone of interest to enable the logging tool sensors to be positioned deep enough to acquire data over the lower section of the zone of interest). In addition, a long tool has a tendency of getting stuck in wellbores having poor borehole conditions and cannot be placed into wellbores having severe dog legs or horizontal wells having a short kickoff radius.

Therefore, it is desirable to have shorter resistivity logging tools. One approach to shorten the tool length is to use a folded antenna array as disclosed in U. S. Pat. No. 5,905,379 issued to Orban et al. (shown in FIG. 1B). In the folded antenna arrays, the receiver antennas and the bucking coils are all disposed on one side of the transmitter antenna, instead of on both sides of the transmitter antenna (see FIG. 1A). The folded array significantly reduces the length of the tool, i.e., to about sixteen feet including the associated electronics. The antenna section length is about 8 feet.

Induction array tools provide good performance, but they use shallow-reading induction antenna instead of galvanic electrodes to measure the near wellbore resistivity. In "bad hole" conditions (i.e. washed-out or rugose wellbores), the electrode devices (e.g., an SFL) can provide better resistivity measurements than the shallow-reading induction antennas. In addition, at high resistivities, the electrode devices can provide better resistivity measurements than an induction device. For these reasons, SFL or other shallow electrode devices are more robust. Accordingly, electrode devices are preferred under high resistivity and bad hole conditions, which are often found in low-cost wells.

Another interest in having better induction tools including SFL or electrode devices stems from the fact that many old resistivity logs are acquired with induction-SFL type devices that measured ILD, ILM and SFL. With the recent interests in redeveloping old oil fields that have not been developed because of thin pay zones, there is a new demand for apparatus and methods that not only can provide accurate measurements, but also offer the possibility of well-to-well correlation with the "old"induction-SFL measurements.

Therefore, a need exists for better, but simpler, resistivity logging tools and methods for acquiring induction-SFL measurements.

SUMMARY OF INVENTION

In one aspect, embodiments of the invention relate to well logging tools. A well logging tool in accordance with one embodiment of the invention includes an induction array stack disposed on a mandrel; an electronic module stack disposed adjacent the induction array stack along a longitudinal axis of the well logging tool; and a shallow electrode array arranged on a housing disposed around the electronic module stack, wherein the induction array stack comprises a transmitter antenna, a first receiver antenna, and a second receiver antenna spaced apart from each other along the longitudinal axis of the well logging tool, the second receiver antenna being disposed between the transmitter antenna and the first receiver antenna.

In another aspect, embodiments of the invention relate to well logging methods. A method for well logging in accordance with one embodiment of the invention uses a tool that includes an induction array stack disposed on a mandrel; an electronic module stack disposed adjacent the induction array stack along a longitudinal axis of the well logging tool; and a shallow electrode array arranged on a housing disposed around the electronic module stack, wherein the induction array stack comprises a transmitter antenna, a first receiver antenna, and a second receiver antenna spaced apart from each other along the longitudinal axis of the well logging tool, the second receiver antenna being disposed between the transmitter antenna and the first receiver antenna, and wherein the induction array stack is no more than 8 feet long. The method includes disposing the tool in a wellbore; acquiring a first resistivity measurement using the first receiver antenna and a second resistivity measurement using the second receiver antenna; acquiring a shallow resistivity measurement; and processing the first resistivity measurement, the second resistivity measurement, and the shallow resistivity measurement to provide a formation resistivity.

BRIEF DESCRIPTION OF DRAWINGS

FIG. 1A shows a prior art induction tool having a long antenna array stack.

FIG. 1B shows a prior art induction tool having a folded antenna array.

FIG. 2 illustrates a well logging tool according to one embodiment of the present invention.

DETAILED DESCRIPTION

Figure 3:
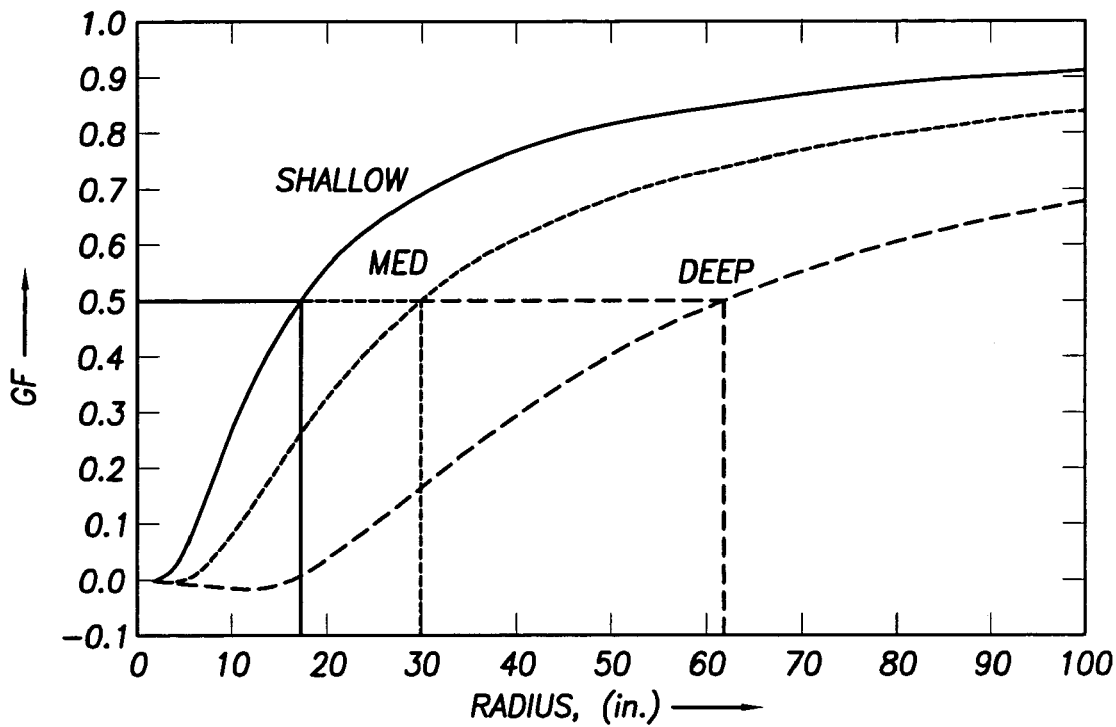
FIG. 3 shows radial response profiles of the induction arrays according to one embodiment of the present invention.

The present invention relates to apparatus and methods for measuring formation resistivity. A logging tool in accordance with embodiments of the invention has simplified components and yet can provide measurements that are comparable to more sophisticated tools. In addition, a tool in accordance with embodiments of the invention is capable of providing depths of investigation comparable to the prior art tools such that measurements made with tools of the invention may be compared with those from other tools. Thus, embodiments of the invention use a simple approach to satisfy the industry demand for efficient and cost effective apparatus and methods, and at the same time address the desire for accuracy of measurement and the possibility of correlating with old well logs.

As noted above, several factors should be taken into consideration in designing an induction tool. These factors include depth of investigation (DOI), resolution, borehole effects, frequency of operation, and mutual inductance. Embodiments of the invention take into account most of these factors, but use simple configurations to achieve the desired results.

FIG. 2 shows a tool in accordance with embodiments of the invention based on a prior art induction-SFL tool, such as that sold under the trade name of DIT™ by Schlumberger Technology Corporation (Houston, Tex.). As shown, the induction-SFL tool 400 comprises an induction array stack 402 and a shallow electrode array 401. The induction array stack 402 provides the measurements similar to the deep-reading and medium-reading measurements of prior art induction tools, while the shallow electrode array 401 provides the near wellbore resistivity similar to a prior art SFL device.

In the embodiment shown, the induction array stack 402 is disposed on a mandrel 41, which may be a conductive mandrel as disclosed in U.S. Pat. Nos. 4,651,101 and 4,873,488 issued to Barber et al. and assigned to the assignee of the present invention. The induction array stack 402 may comprise a transmitter antenna 42 and a plurality of receiver antennas 44, 46, 48 and bucking antennas 43, 45, 47. As in prior art folded array induction tools, the induction array stack 402 in accordance with embodiments of the invention has the receiver antennas 44, 46, 48 and the bucking antennas 43, 45, 47 disposed on one side of the tool relative to the transmitter antenna 42. For clarity in the description, "antenna" i s used herein to refer to both a single-coil antenna and a multiple-coil antenna system (e.g., a focused coil system).

As shown in FIG. 2, the induction array stack 402 of the present invention includes an antenna for deep resistivity measurements. The deep-reading antenna 48 measures the resistivity far away from the borehole. The deep-reading measurement is less affected by mud invasion and the measured resistivity, after any necessary correction, can provide true formation resistivity ($R_t$). As noted above, the deep DOI can be achieved with longer transmitter-receiver spacings. However, longer spacings necessarily make the tools longer. A tool in accordance with a preferred embodiment of the invention has a deep-reading antenna 48 disposed on the induction array stack 402 at about 45 inches from the transmitter antenna 42. The about 45-inch spacing provides a sufficiently deep DOI without making the tool too long. A bucking antenna 47 is disposed at an appropriate location (e.g., about 27 inches from the transmitter antenna 42) between the transmitter antenna 42 and the deep-reading antenna 48 to minimize or alleviate direct couplings (mutual inductance) between the transmitter antenna 42 and the deep-reading antenna 48.

The 45-inch spacing between the transmitter 42 and the deep-reading antenna 48 is similar to that found on the AAIT™ By using a similar configuration as a component of an existing tool, the cost of a tool of the invention may be minimized. n addition, the 45-inch spacing between the transmitter 42 and the deep-reading antenna 48 can provide a DOI that is comparable to the deep readings (ILD) of old tools (e.g., DIDIT™ If a deeper investigation is desired, the 45-inch measurements of the present invention may be combined (negatively) with other measurements (e.g., measurements obtained using a 22-inch array to be described later), according to methods known in the art. For methods of combining different DOI measurements to achieve a deeper measurement, see for example U.S. Pat. No. 5,157,605 issued to Chandler et al. and assigned to the assignee of the present invention. This patent is incorporated by reference in its entirety. Thus, a tool of the present invention can provide measurements as deep into the formation as the prior art tools with a much shorter length.

In addition, a tool of the invention also comprises a medium-reading antenna 46 disposed in the array stack 402 at about 22 inches from the transmitter antenna 42. A bucking antenna 45 is disposed at an appropriate location (e.g., 16 inches from the transmitter antenna 42) between the transmitter antenna 42 and medium-reading antenna 46 to minimize or alleviate direct couplings between these two antennas. Again, the 22-inch spacing is based on the existing AIAIT™ to minimize the costs of the tools, while maintaining the ability to provide measurements that are comparable to the medium DOI measurements (ILM) acquired using prior art tools (e.g., a dual induction-SFL tool, sold under the trade name of DIT™ by Schlumberger Technology Corporation (Houston, Tex.)). The ILM acquired with DIT™ typically has a DOI of about 30 inches, which is identical to the DOI provided by the medium-reading antenna 46 of the tool shown in FIG. 2.

As shown in FIG. 2, a tool of the invention may optionally include a short-reading antenna 44, which is disposed in the array stack at about 12 inches from the transmitter 42. The short-reading antenna 44 measures resistivity at a shallow DOI (e.g., about 18 inches) that is likely in the mud invaded zone. The short-reading antenna 44 is optional because in a conductive mud, an SFL device (to be described later) may be used to measure the near wellbore resistivity. However, if a non-conductive mud (i.e., oil-based mud, OBM) is used, the shallow-reading antenna 44 is more suitable for measuring near borehole resistivities. The measurement of the invaded zone resistivity is important for two reasons: it provides evidence for mud invasion, which indicates a formation is permeable; and it provides a value that can be used to calculate resistivity porosity after a correction is made for unflushed oil in the invaded zone. A bucking antenna 43 is disposed at an appropriate location (e.g., 9 inches from the transmitter antenna 42) between the transmitter 42 and short-reading antenna 44 to minimize or alleviate direct couplings between these two antennas.

FIG. 3 shows the radial responses of the induction tool shown in FIG. 2. As shown, at a geometric factor (GF) of 0.5, the shallow-reading antenna 44, the medium-reading antenna 46, and the deep-reading antenna 48 have DOIs of about 18 inches, 30 inches, and 61 inches, respectively. Thus, these three antennas 44, 46, and 48 may be used to simulate an SFL response, an ILM response, and an ILD response of the prior art DIT™, respectively.

The above description for a preferred embodiment of the invention shows that the receiver antennas are arranged at certain spacings from the transmitter antenna. These particular spacings are selected to be identical to existing tools (e.g., AIT AIT™ minimize the cost of the tool and at the same time preserve the desired property of the tool. One of ordinary skill in the art would appreciate that the antennas in the induction array stack 402 may also be spaced at other spacings to provide the desired measurement characteristics. The invention is, therefore, not limited to the particular spacings shown in FIG. 2.

With transmitter-receiver spacings identical to those found in existing tools, a tool in accordance with the invention may use existing electronic components to minimize the cost. For example, the embodiment shown in FIG. 2 may use the same electronic modules used in AIT AIT™ typically, these electronic modules are arranged in a stack disposed above the antenna array stack. In addition, the cost of the induction array stack 402 may be further minimized if the ceramic spacers (or bobbins) are replaced with fiberglass spacers (or bobbins). When using fiberglass spacers, the fiberglass cloth is preferably oriented in a way to give a longitudinal thermal expansion coefficient that is as low as possible.

A preferred tool in accordance with the invention comprises one transmitter antenna and two or three receiver antennas (the transmitter and the receivers form antenna arrays). While additional induction arrays may be included, they increase the complexity and cost of the tool. Furthermore, additional antennas may require the use of co-wound receiver/bucking coils. For example, the prior art tool shown in FIG. 1B uses more complex co-wound receiver/bucking coil arrays. The complexity stems from the requirement that two criteria must be satisfied at the same time: the turn ratio between the turns of a particular receiver coil (N) and its corresponding bucking coil (N) must be carefully selected in order to balance or null the direct mutual coupling between the transmitter and receiver array; and when the aforementioned turns ratio is carefully selected, the receiver coil (N-1) and the bucking coil (N), associated with another receiver coil (N), must be co-wound on the same ceramic bobbin at the same distance from the transmitter. In contrast, embodiments of the present invention, having simple antenna arrays, do not require the use of co-wound antennas, i.e., co-wounding is optional with embodiments of the invention.

The electronic components for controlling and transmitter antenna 42 and the receiver antennas 44, 46, 48 may be arranged in an electronic module stack 403 and disposed adjacent (above or below) the induction antenna array stack 402. In the embodiment shown in FIG. 2, the electronic module stack 403 is disposed above the induction array antenna stack 402 along the tool axis. As noted above, the electronic components for the tool shown in FIG. 2 may use similar electronic modules as those found in the existing tools, such as AIT™. In a preferred embodiment, the diameter of the electronic module stack 403 is small such that a housing (sleeve) that supports the shallow electrode array 401 may be disposed around the electronic module stack 403 without making the tool diameter too large. In addition, the length of the electronic module stack 403 is preferably short such that the overall tool length may be kept as short as possible.

In addition to the induction array stack 402, a tool in accordance with the invention also includes a shallow electrode array 401. The shallow electrode array 401 is for measuring near wellbore resistivity, e.g., at a DOI of about 18 inches. One of ordinary skill in the art would appreciate that other electrode array configurations are possible to achieve the desired measurements.

In accordance with one embodiment of the invention, the shallow electrode array 401 may be based on a feed back controlled spherically focused laterolog (SFL) device. The shallow electrode array 401 comprises current return electrodes $A_1$ and $A'_1$, monitor electrodes $M_0$, and $M'_0$, and measurement electrode pairs $M_1$, $M_2$ and $M'_1$, $M'_2$, all symmetrically disposed on both sides of a central current electrode $A_0$ as shown in FIG. 2. In a preferred embodiment, all these electrodes are arranged on an insulated housing 40 that is disposed over the electronic module stack 403, which is also mass-isolated and insulated.

The shallow electrode array 401 shown in FIG. 2 is similar to a prior art SFL device. However, the overall length of the shallow electrode array 401 is shorter (e.g., about 6 feet) than a typical SFL device (about 10 feet). Furthermore, to minimize the dimension of the tool, the shallow electrode array 401 may share the same electronic module stack 403 with the induction array stack 402. For example, the central current electrode $A_0$ may be coupled to the induction transmitter 42 and the electrode measurement circuitry for other electrodes may be shared with that for the receiver antennas 44, 46, 48. With the shared circuitry, a constant power arrangement, similar to that used in the high-resolution azimuthal laterolog sondes, sold under the trade name of HALS™ by Schlumberger Technology Corporation (Houston, Tex.), may be used to limit the dynamic range of the voltage measurements. The constant power arrangement may be switched out for the induction transmitter, if necessary. The high-resolution azimuthal laterolog sonde technology is disclosed, for example, in U.S. Pat. No. 5,754,050, issued to Smits et al., U.S. Pat. No. 5,852,363, issued to Smits, U.S. Pat. No. 6,046,593, issued to Eisenmann et al., and U.S. Pat. No. 6,369,575, issued to Eisenmann et al. These patents are assigned to the assignee of the present invention and are incorporated by reference.

While the above description is based on an SFL-based electrode array, one of ordinary skill in the art would appreciate that a tool in accordance with embodiments of the invention may also be based on other electrode array configurations, such as a shallow electrode array of the high-resolution laterolog array tool sold under the trade name of HRLA HRLA™ by Schlumberger Technology Corporation (Houston, Tex.).

As in a prior art SFL, the shallow electrode array 401 shown in FIG. 2 operates with two current modes: an auxiliary current from the central electrode $A_0$ to the current return electrodes $A_1$, $A_1$"; and a survey (investigation) current from the central electrode $A_0$ to a current return located at a distance from the shallow electrode array 401. In a prior art SFL (e.g., the SFL device on the DITe DIT™), the survey current returns to the tool body above the tool. However, with the electronics housing mass-isolated and insulated in a tool according to embodiments of the invention, an electrode (which may be mass-isolated) may be used in the topmost tool in the string to provide current returns.

During logging, auxiliary currents are emitted from the central current electrode $A_0$ and returned to current return electrodes $A_1$ and $A$". The auxiliary currents force the survey currents into the formation to form an approximately spherical shape on the equipotential surfaces within the formation The focusing condition is obtained when the readings at $M_1$ and $M_2$ are identical. One of ordinary skill in the art would appreciate that the monitoring and maintaining the focused condition may be software controlled to minimize hardware requirement (hence, the dimensions of the tool). However, hardware may be used if so desired.

A tool in accordance with embodiments of the invention may optionally include an electrode 51 at the end of the tool to measure mud resistivity. This electrode 51 is similar to the $R_m$ sensor of the AIT™ tool. It has been shown that the arrangement of the sensor at the bottom of the tool is much less sensitive to proximity effects of the borehole wall. Thus, the measurements acquired by electrode 51 may be used to correct borehole and mud effects according to methods known in the art, for example, using look-up tables.

According to the embodiment described in FIG. 2, the induction array stack 402 length is about 45 inches. This length together with 12 inches on either side of the array stack 402 makes the tool about 63 inches (about 5.3 feet) long. This length is much shorter than that of AIT™ (about 8 feet) or that of DIT™ (about 13 feet). The shallow electrode array 401 of the invention is about 6 feet long, which together with the both end sections makes the tool about 8 feet long. This length is shorter than that of a typical prior art SFL device (about 10 feet long). Thus, the total length of the tool 400 according to one embodiment of the invention may be as short as 13 feet, which is much shorter than most prior art induction-SFL tools (typically 15 feet or longer).

After acquisition, the conductivity measurements may be corrected for various environmental effects using conventional processing methods. For example, skin effects may be reduced by phasor processing of the individual array measurements. Phasor processing is disclosed in U.S. Pat. No. 4,513,376 issued to Berber and assigned to the assignee of the present invention. This patent is incorporated by reference in its entirety. Briefly, in phasor processing, a filtering function is applied to the quadrature-phase X component of each log measurement to obtain a correction factor representative of the change in the sonde response function as a function of formation conductivity. The correction factors are then summed with the in-phase R components to provide a skin effect compensated log.

Similarly, U.S. Pat. No. 4,471,436 issued to Shaefer et al. discloses methods for correcting shoulder effects and skin effects using phasor processing. This Patent is assigned to the assignee of the present invention and is incorporated by reference in its entirety. Shoulder effect is reduced by generating a spatial deconvolution filter that, when convolved with the sonde response function, sharpens the main lobe and reduces the sidelobes to near zero. Other methods for enhancing the resolution of an induction logging tool may be found in U.S. Pat. Nos. 4,818,946 and 4,837,517, both issued to Barber and assigned to the assignee of the present invention. These patents are incorporated by reference in their entirety. In addition, borehole corrections may also be corrected using methods known in the art, e.g., by using look-up tables.

Figure 4:
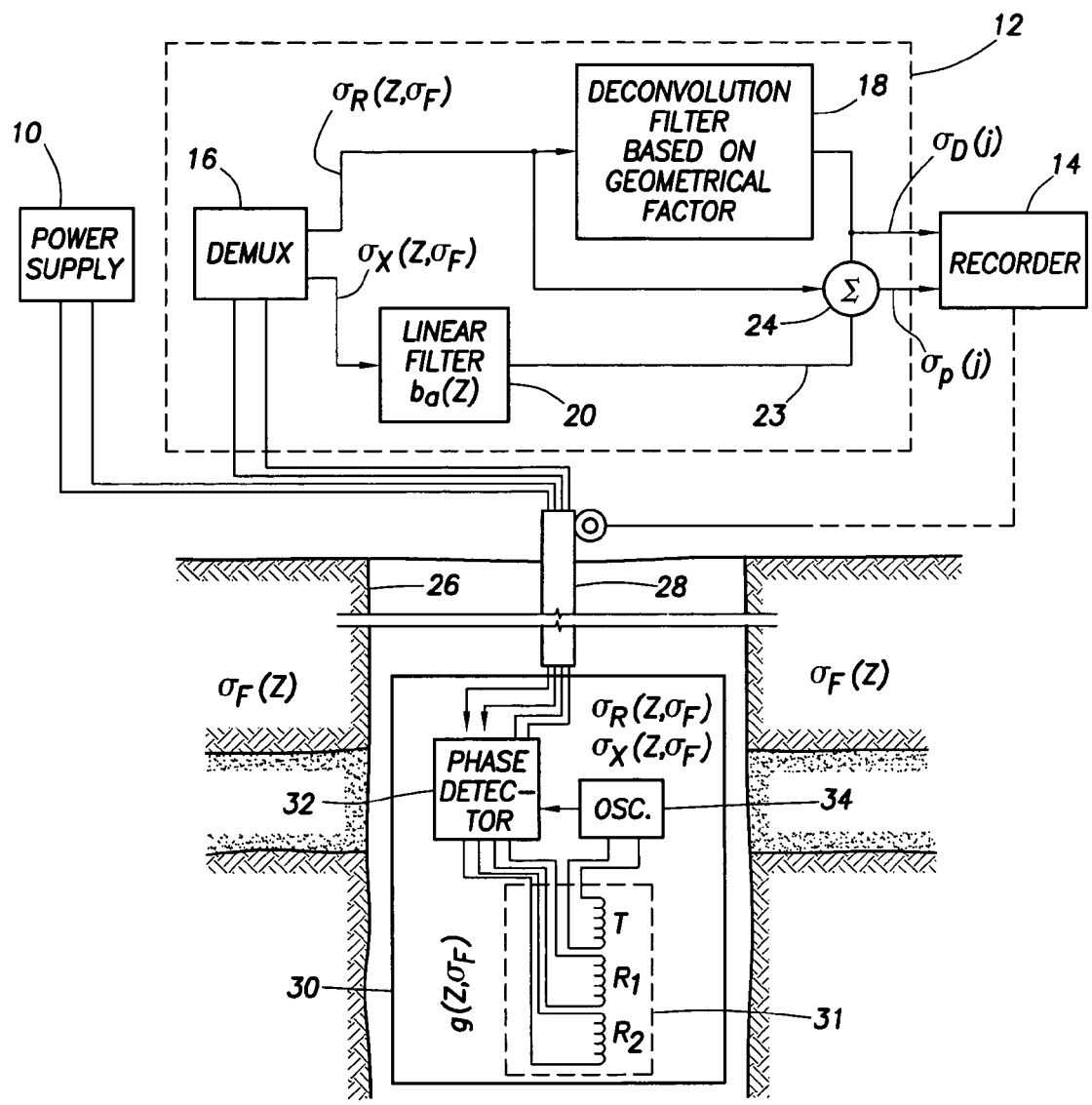
FIG. 4 is a block diagram showing an implementation of induction phasor processing.

FIG. 4 illustrates a typical induction logging system, which may be implemented in a tool according to embodiments of the invention. As shown in FIG. 4, an induction logging tool 30 is suspended in a borehole 26 by some means of conveyance 28 (the means related to any wireline, logging-while-drilling or measurement-while-drilling technique). The tool 30 is powered by power supply 10 and includes a sonde 31 with a three-coil induction array including a transmitter T and two receivers $R_1$ and $R_2$. The sonde 31 has a sonde response function $g(z, \sigma_F)$, which maps the formation conductivity $\sigma_F(z)$ into the log measurements. Tool 30 also includes a phase sensitive detector 32 which responds to signals from the transmitter oscillator 34 and the received signals from receivers $R_1$ and $R_2$ to generate the in-phase, $\sigma_R(z, \sigma_F)$, and quadrature-phase, $\sigma_X(z, \sigma_F)$, components for each log measurement.

A processing unit 12, which may be a general purpose programmed computer, includes a demux 16, which separates the two components of each log measurement received from the tool 30. The in-phase component is applied to deconvolution filter means 18 and provisionally to summation means 24. The quadrature-phase component may be applied to linear filter means 20, as described in U.S. Pat. No. 4,513,376 issued to Barber. Deconvolution filter means 18 implements a filter response function h(z) based on the geometrical factor response function $g_{GF}(z)$. The output of filter 18 is deconvolved conductivity measurement $\sigma_D(j)$ and represents a processed measurement. The output from filter 18 is applied to summation means 24, and to recorder 14 for possible recording as a processed log. Provisionally applied to summation means 24 is the in-phase component measurement from demux 16. When used in conjunction with the phasor processing of the quadrature-phase component $\sigma_P(j)$, an improved induction log may be obtained either by summing $\sigma_P(j)$ with $\sigma_D(j)$ or with $\sigma_R(z, \sigma_F)$ directly.

One of ordinary skill in the art would appreciate that any other appropriate processing method that is known in the art may also be used in place of or in addition to the method presented herein. Additionally, with three depths of investigation in either conductive (water-based) or non-conductive (oil-based) mud, step-profile invasion inversion can be provided at this stage by using an appropriate algorithm. Also, the processing required to negatively combine a small weight of the twenty-two (22) inch array with the forty-five (45) inch array to simulate the ILD might be done at this point. Finally, other basic processing may be used to apply typical environmental corrections, for example temperature, hole size, mud resistivity etc.

An extensive set of formation models has been developed in the industry to test induction logging tools and processing methods. Three of these models, the Oklahoma formation model, the Gulf of Mexico formation model, and the Conoco test well, were used to illustrate the capabilities of a tool of the present invention. The responses of a tool shown in FIG. 2 can be derived from measurements acquired with the AIT™ 12, 21, and 39-inch arrays and processed with the AIT™ Recovery algorithm. These responses are compared with the responses of the AIT™ and the prior art DIT™. The AIT™ measures an array of conductivities, including ten (10) inch, twenty (20) inch, thirty (30) inch, sixty (60) inch and ninety (90) inch depths of investigation. The DIT™ measures SFL at a DOI of about 18 inches, ILM at a DOI of about a 30 inches, and ILD at a DOI of about 61 inches.

FIGS. 5A–5C, FIGS. 6A–6D and FIGS. 7A–7C show comparison logs produced by different tools using the three formation models. Each log depicts various curves from a designated tool: the DIT™, the AIT™ and a tool of the present invention. The curves presented on these logs include resistivities (ohm-m), true resistivity $R_t$, hole diameter (inches), the log interval (feet), and a radius of invasion $r_i$ (inches). In addition, the logs depicted in FIGS. 6A–6D and FIGS. 7A–7C also show an invaded (or transition) zone resistivity curve $R_{xo}$.

Figure 5A:
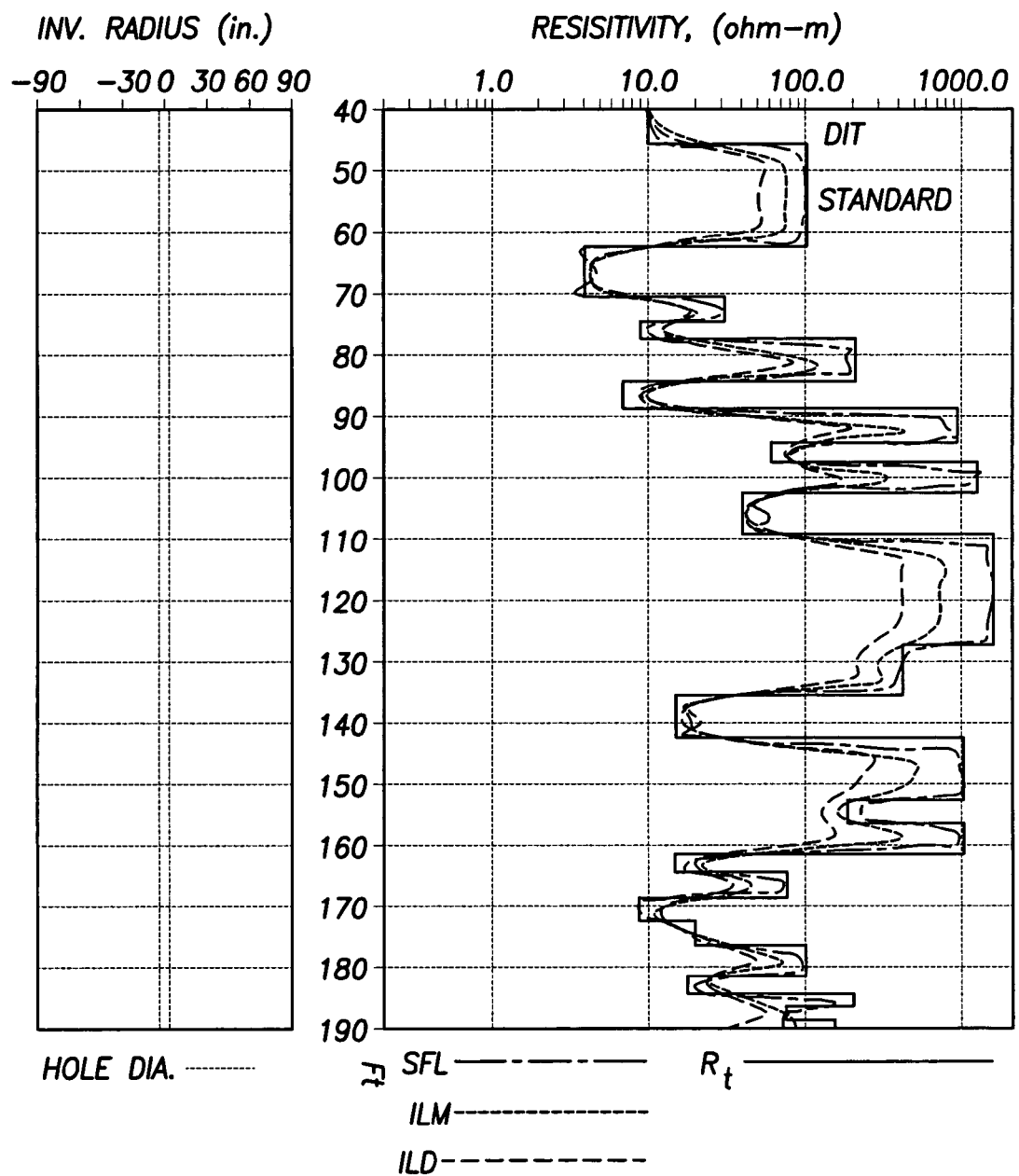
FIGS. 5A–5C show comparison logs of measurements acquired using prior art tools and a tool according to one embodiment of the present invention.
Figure 5B:
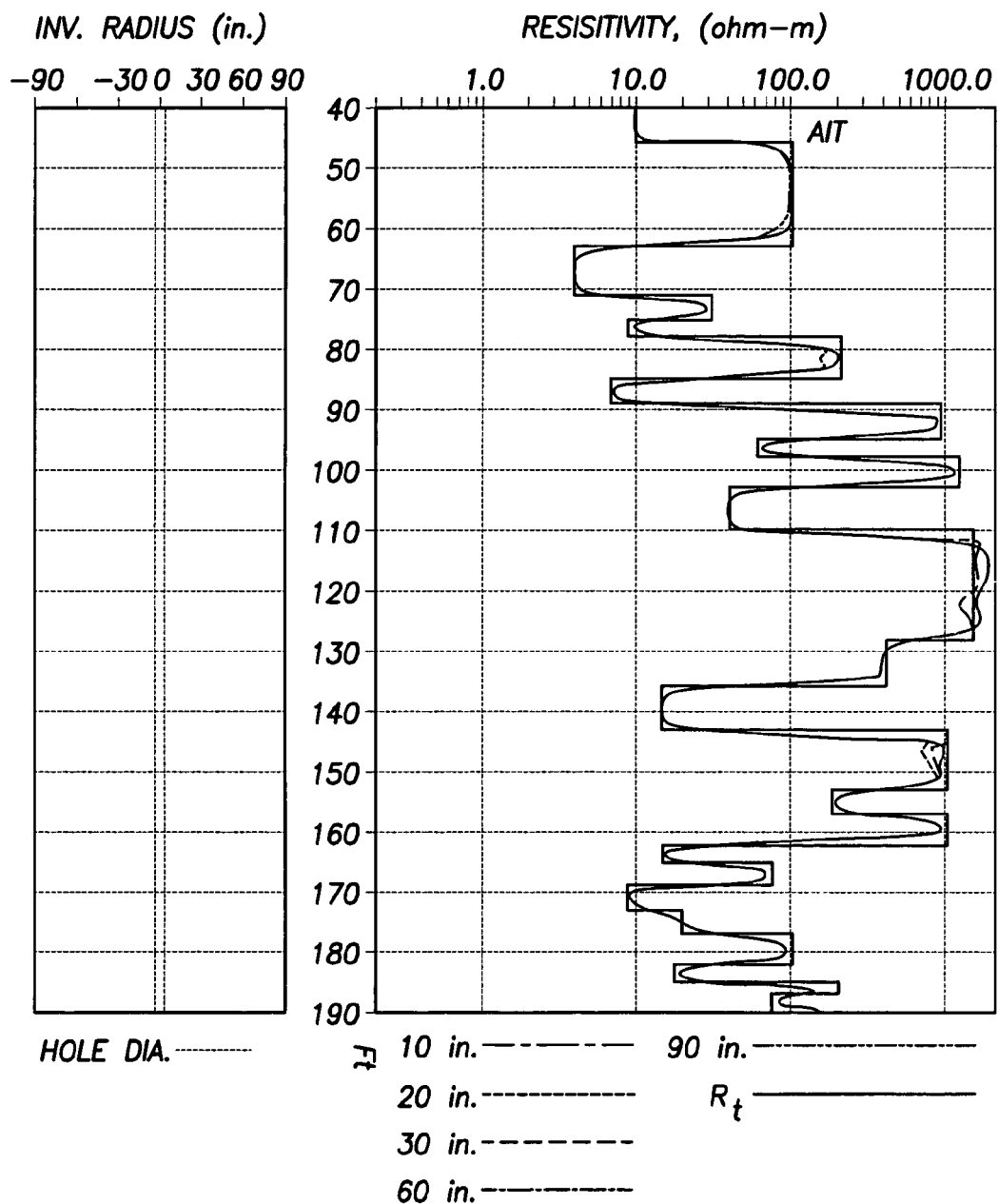
Figure 5C:
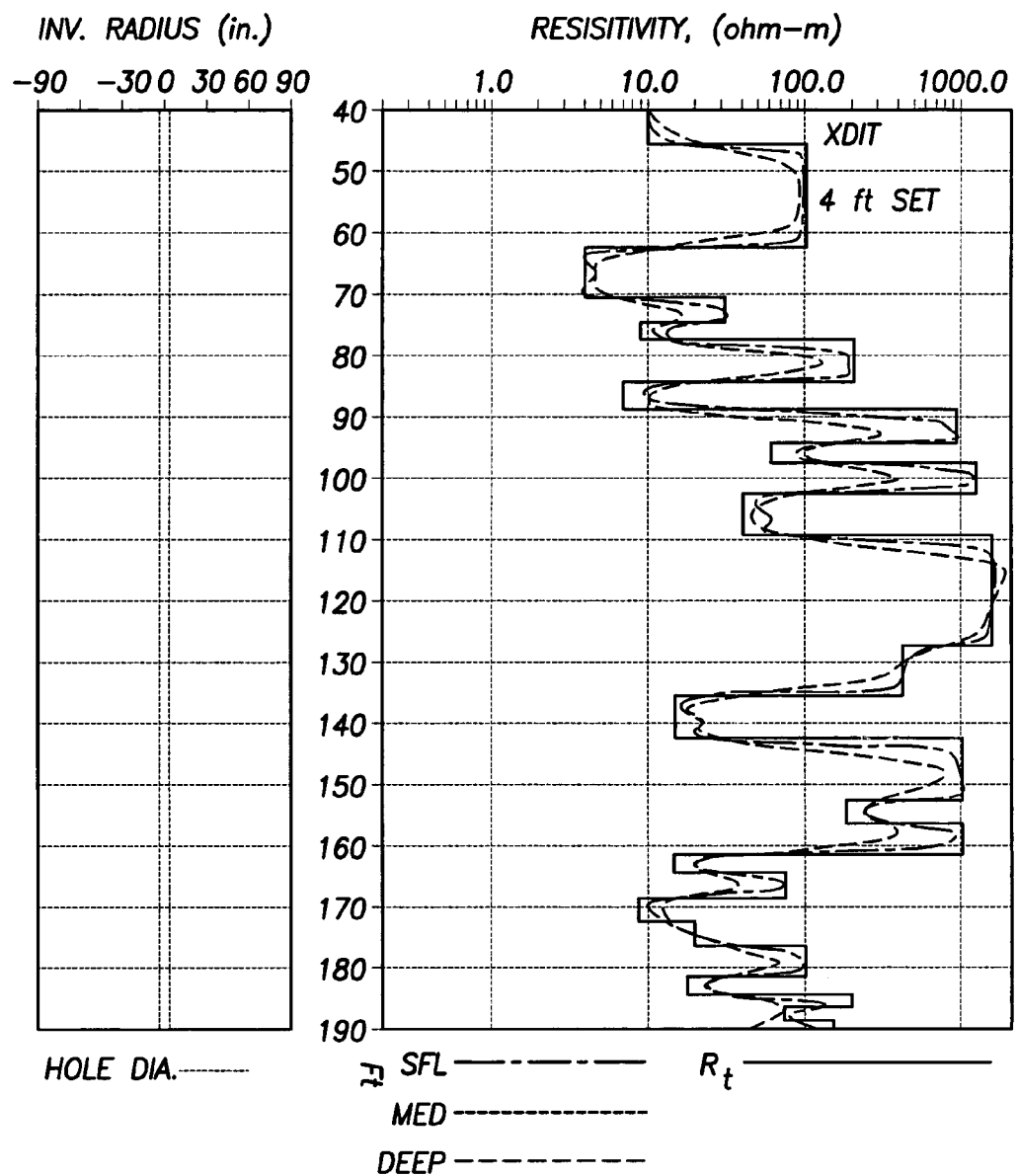

FIGS. 5A–5C are logs produced using the Oklahoma formation model. FIG. 5A is a DIT™ Standard log. It is clear from this log that this tool does not produce accurate true resistivity ($R_t$). This is most apparent in the 20-foot log interval between 110 feet and 130 feet. The inaccuracy of both the ILM and the ILD measurements in this high resistivity region is apparent even when bed resolution is not an issue. In contrast, the AIT™ log in FIG. 5B illustrates a near perfect log response over a full range of resistivities, including the 20-foot interval between 110 feet and 130 feet. Also, note the step-like profile seen on the AIT™ log vs. the smooth curves seen on the DIT™ log. The different curve characteristics, along with the large discrepancy in the measured resistivities, may render it difficult to make well-to-well correlation between the new AIT™ log and the old DIT™ log.

In FIG. 5C, a tool of the present invention provides a log that is close to the log of the more sophisticated AIT™. Note that a tool of the present invention achieves this result with only two induction arrays and an SFL device, whereas the AIT™ uses five induction arrays. It is apparent from the log in FIG. 5C that the shoulder effects in the log obtained using a tool of the present invention have been fully corrected. Therefore, the formation resistivities estimated from logs obtained using a tool of the present invention should be more accurate than those derived from DIT™ logs.

Figure 6A:
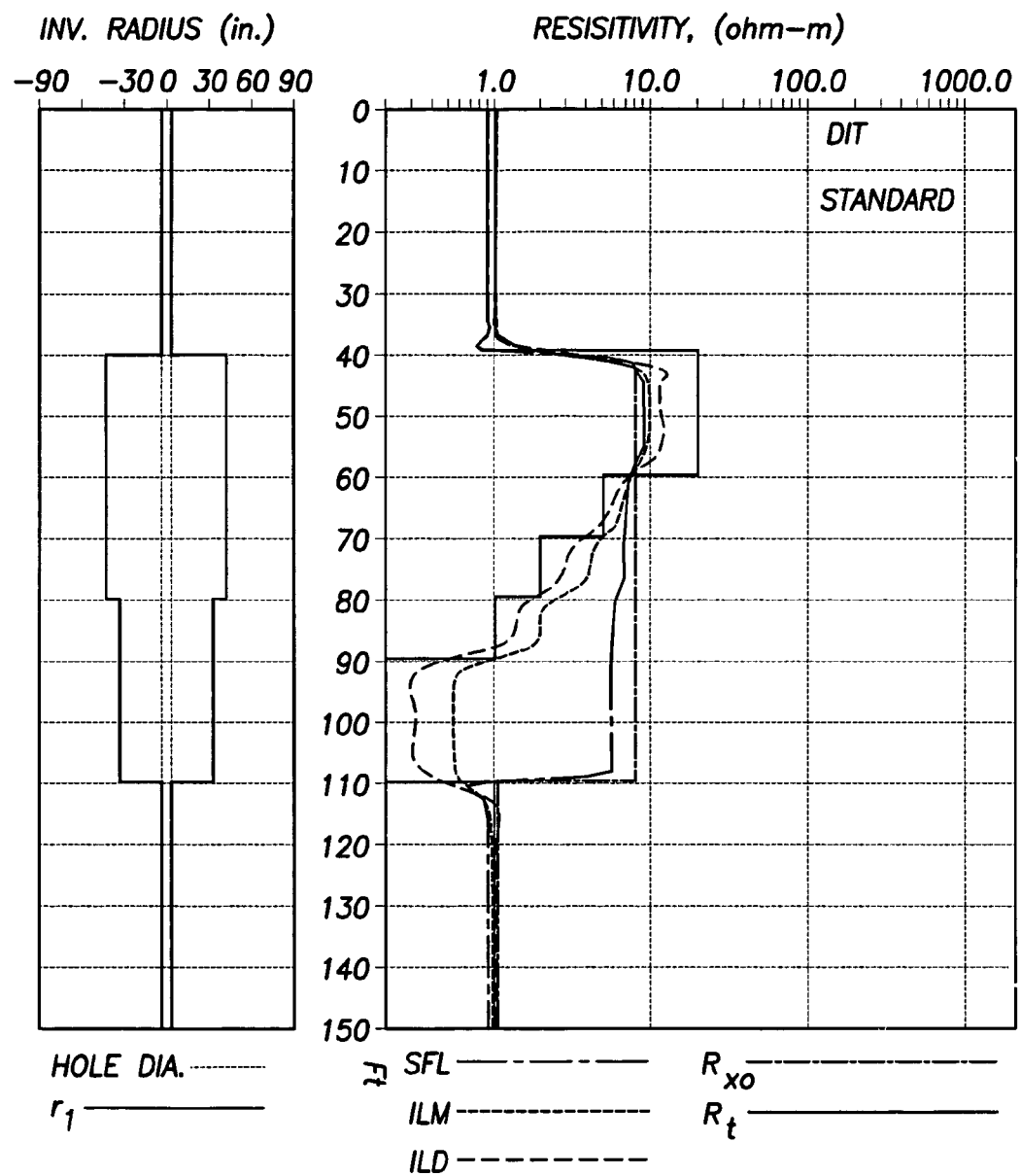
FIGS. 6A–6D show comparison logs of measurements acquired using prior art tools and a tool according to one embodiment of the present invention.
Figure 6B:
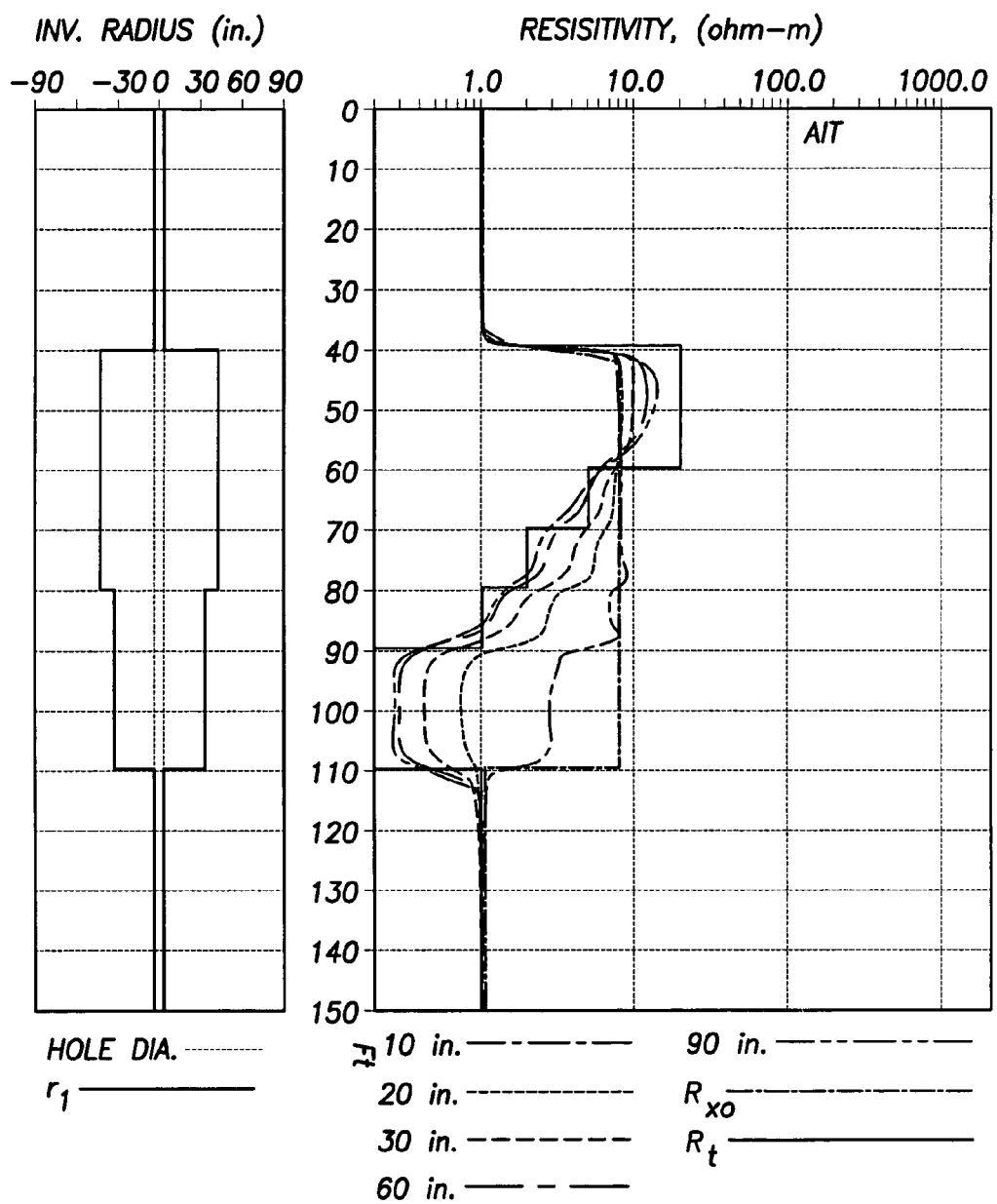
Figure 6C:
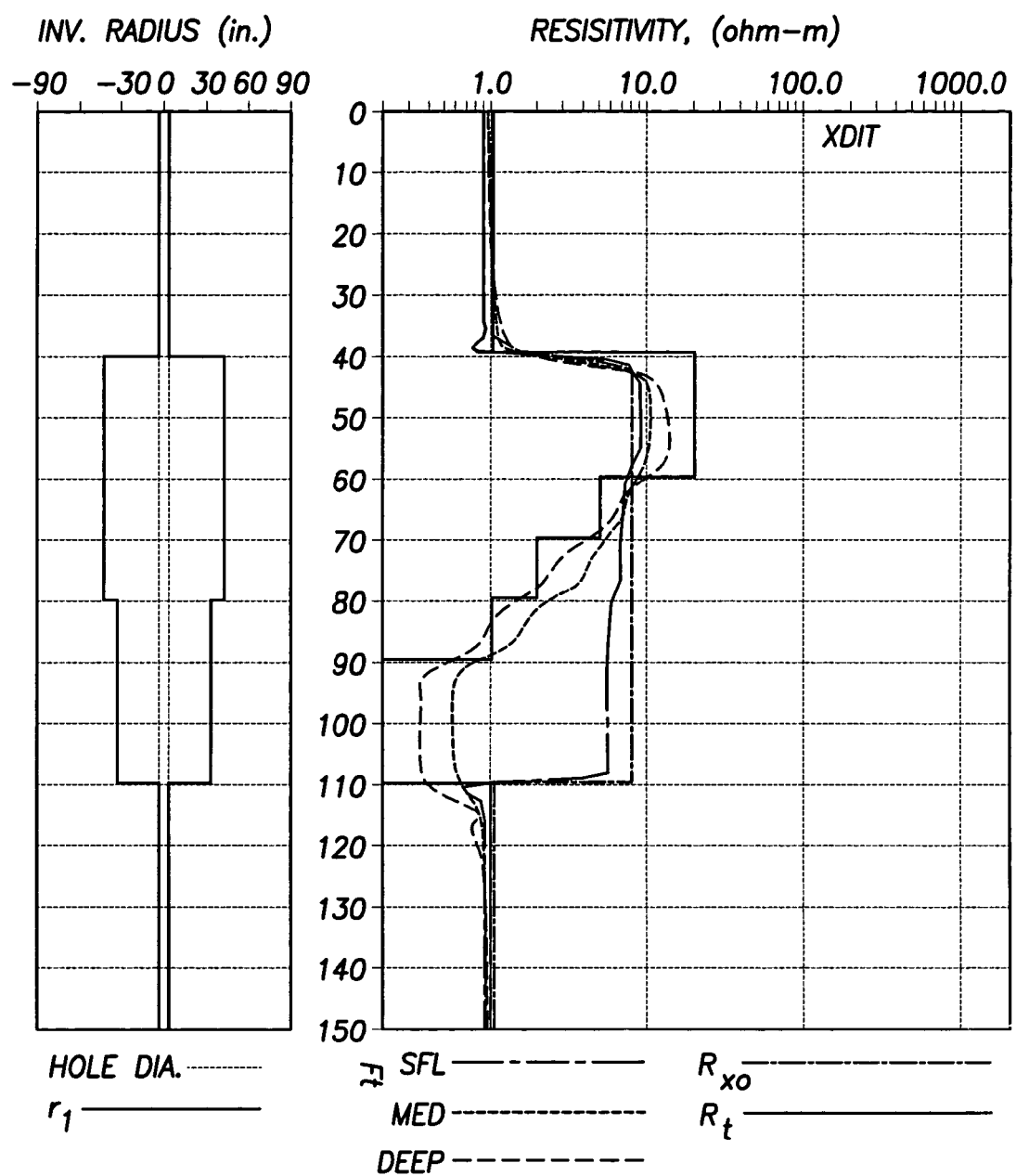
Figure 6D:
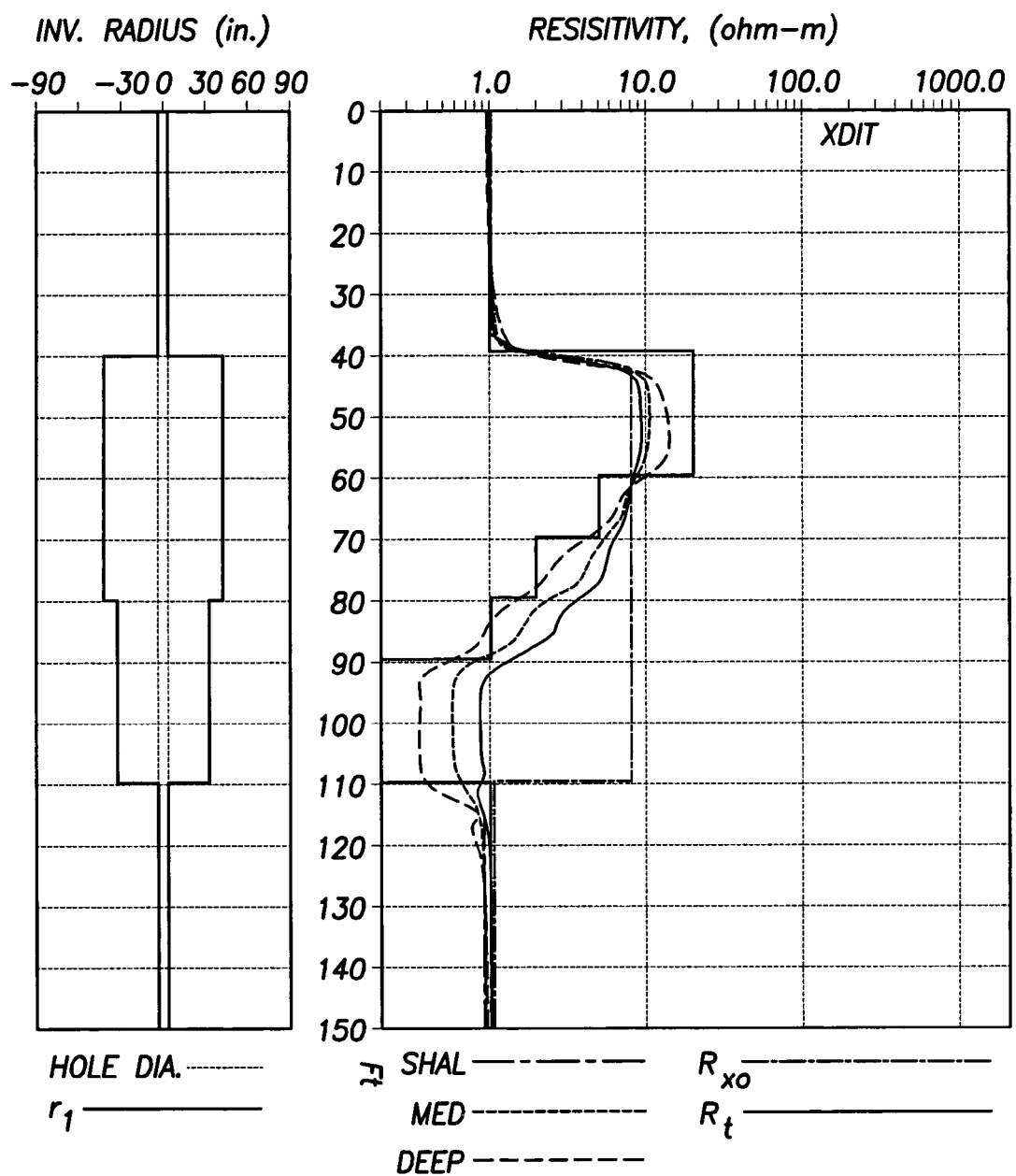

FIGS. 6A–6D show comparison logs produced using the Gulf of Mexico formation model, which has a pay zone (40–60 ft) with $R_{xo}<R_t$ invasion, a transition zone (60–90 ft), and a water zone (90–110 ft). FIGS. 6A–6C show the DIT™ Standard log, the AIT™ log, and the log obtained using a tool of the present invention, respectively. All three logs provide similar resistivity profiles. However, in the water zone with mud invasion (90–110 ft), the SFL devices of the DIT™ and a tool of the present invention provide more accurate invaded zone resistivities ($R_{xo}$). If a tool of the present invention is equipped with a shallow-reading antenna, it may be used instead of the SFL device in an OBM well, as shown in FIG. 6D.

Figure 7A:
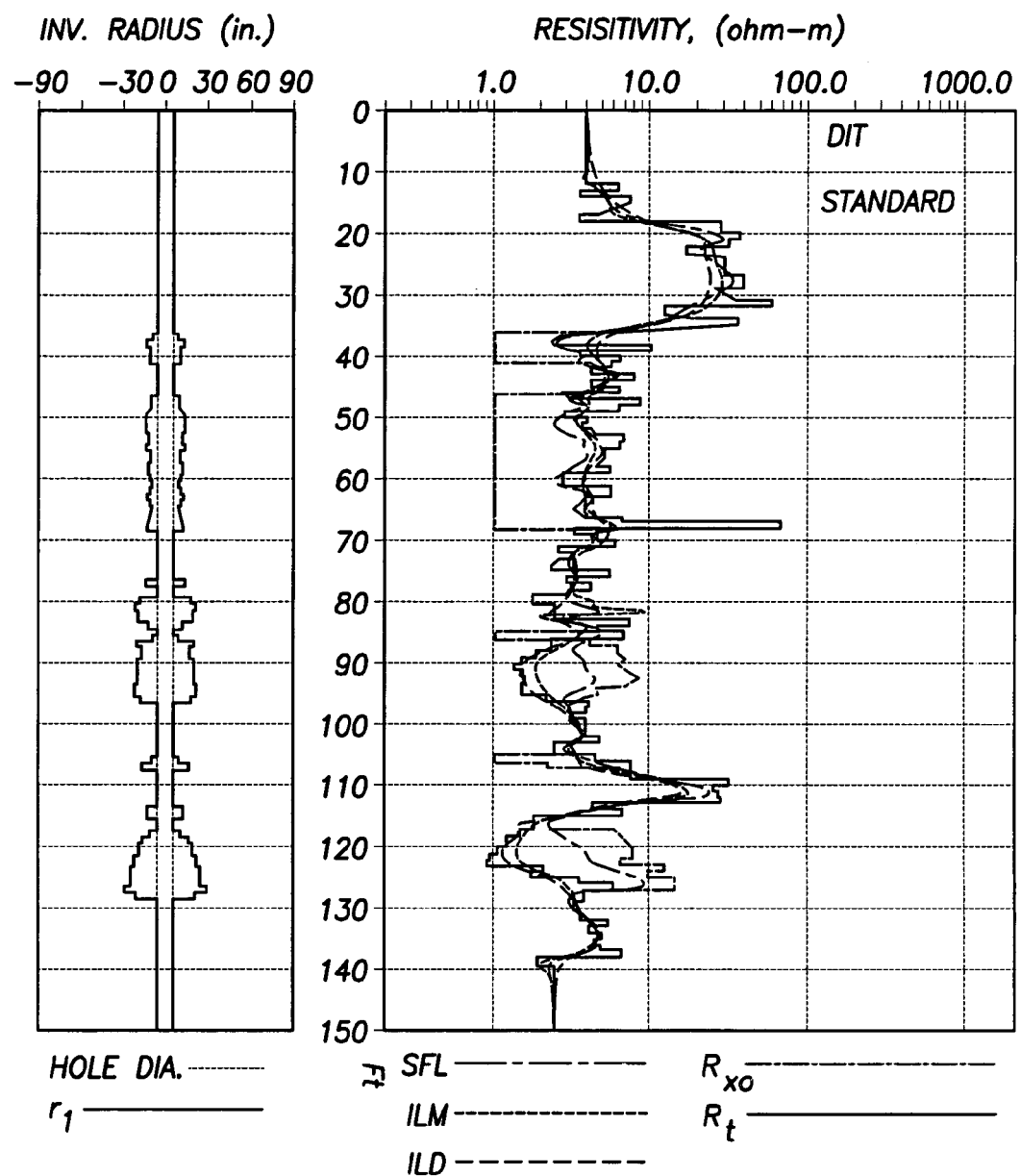
FIGS. 7A–7C show comparison logs of measurements acquired using prior art tools and a tool according to one embodiment of the present invention.
Figure 7B:
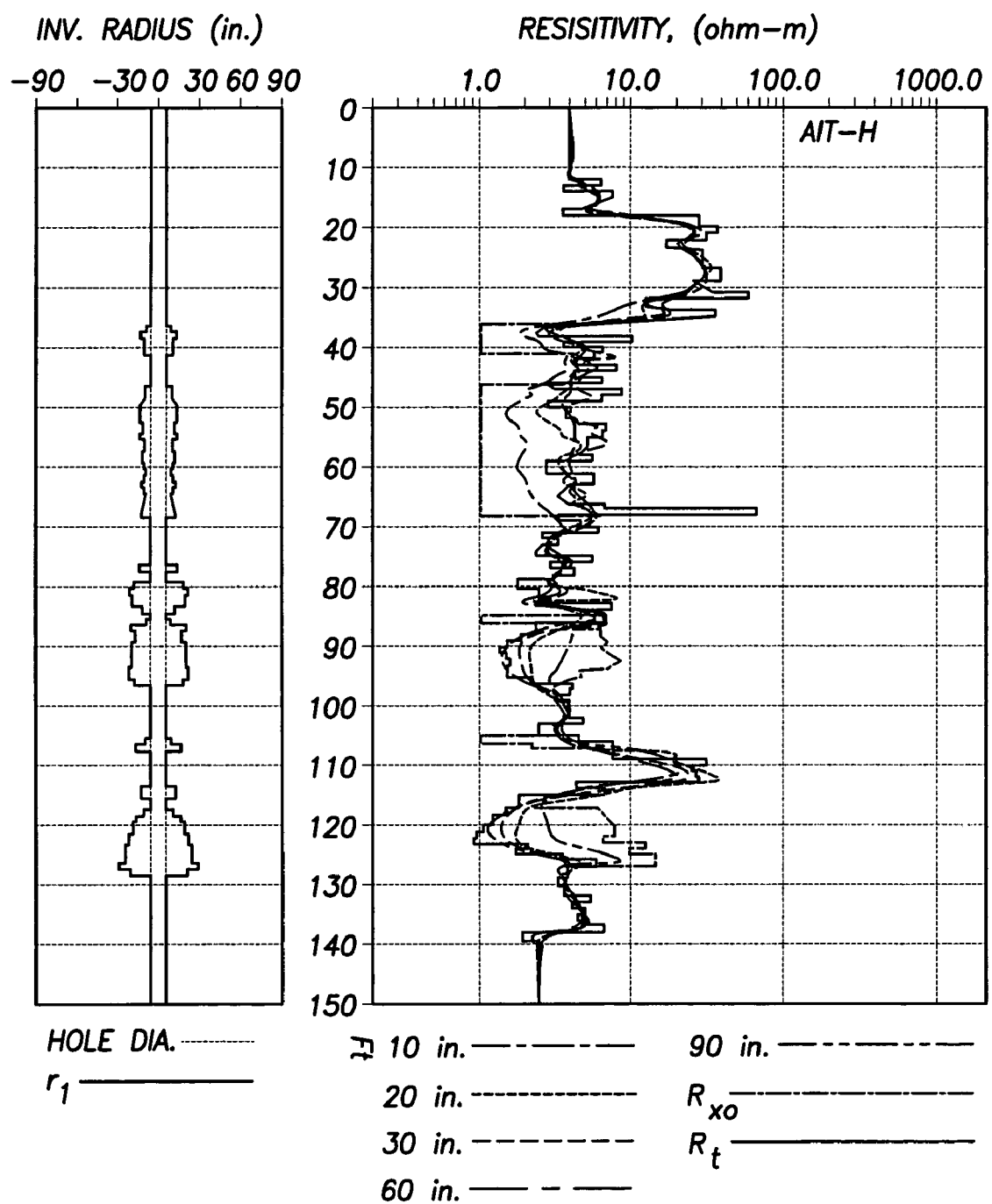
Figure 7C:
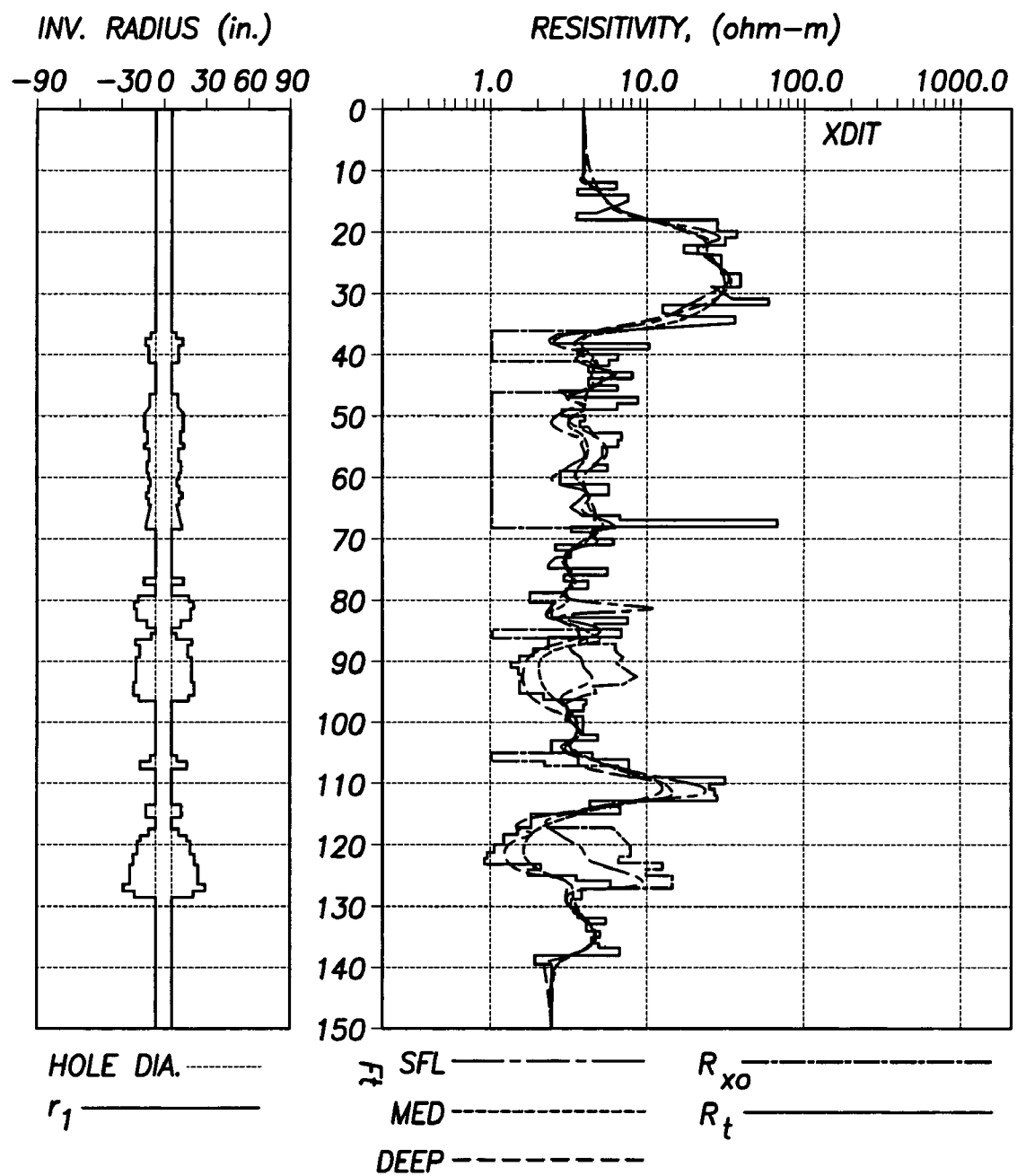

FIGS. 7A–7C show logs produced using the Conoco test well. This well is in bad shape and the wash-outs are modeled as "invaded" zones having an invaded zone resistivity identical to the mud resistivity, i.e., $R_{xo}=R_m$.

FIGS. 7A–7C show the DIT™ traditional logs, the AIT™ logs, and the logs obtained using a tool of the present invention, respectively. In most part, all three tools seem to produce comparable logs, except for the near wellbore measurements in the interval between 45 feet and 70 feet, where low-resistive invasion occurred. Interestingly, the SFL readings of both the DIT™ and a tool of the present invention produce similar results, while the 10-inch induction array of the AIT™ produced a different reading. Thus, a tool of the present invention may be more useful than AIT™ in well-to-well correlations between the new logs and the old DIT™ logs.

Figure 8:
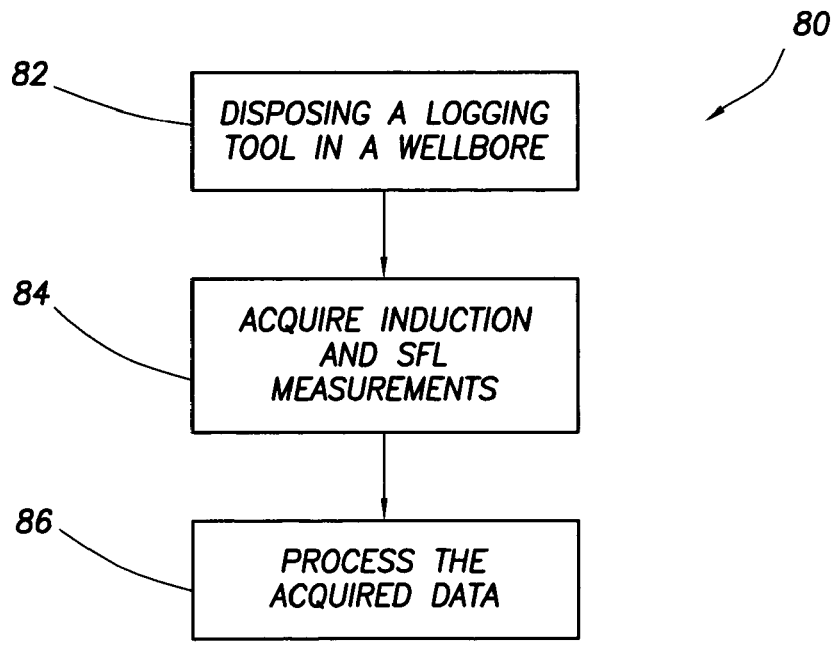
FIG. 8 is a flow chart of a well logging method according to one embodiment of the present invention.

FIG. 8 is a flow chart illustrating a method 80 of well logging according to one embodiment of the invention. The process starts by disposing a well logging tool according to one embodiment of the present invention in a wellbore (step 82). The tool comprises an induction array stack and a shallow electrode array. Next, a series of induction measurements are taken as well as a galvanic electrode measurement (step 84). The acquired data are then processed in order to provide a resistivity measurement with accuracy that is comparable to state of the art technology and at the same time providing a formation resistivity profile with comparable characteristics to that of old induction-SFL logs (step 86).

The advantages of the present invention include efficient apparatus and methods through reduced tool length. A tool in accordance with the invention allows wells to be drilled with less rathole, which in turn reduces drilling time. A shorter tool has a lower risk of sticking. In addition, a shorter tool string may improve the chance of reaching the bottom of the well, particularly when there are doglegs or curvatures in the well. The result is quicker operations and in turn significant rig time savings. A tool in accordance with the invention also requires less frequent sampling interval, which allows for a logging speed that may be as much as twice that of a comparable tool, e.g. an AIT™.

Furthermore, embodiments of the invention can provide measurements that permit well-to-well correlations for analysis of remaining hydrocarbon reserves in old oil and gas fields.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A well logging tool, comprising:
    an induction array stack disposed on a mandrel;
    an electronic module stack disposed adjacent the induction array stack along a longitudinal axis of the well logging tool; and
    a shallow electrode array ranged on a housing and disposed around the electronic module stack, wherein the induction array stack comprises a transmitter antenna, a first receiver antenna, and a second receiver antenna spaced apart from each other along the longitudinal axis of the well logging tool, the second receiver antenna being disposed between the transmitter antenna and the first receiver antenna.

2. The well logging tool of claim 1, wherein the induction array stank is no more than 8 feet long.

3. The well logging tool of claim 1, wherein the first receiver antenna is spaced apart from the transmitter antenna at about 45 inches.

4. The well logging tool of claim 3, further comprising a first bucking coil disposed at a selected location between the transmitter antenna and the first receiver antenna.

5. The well logging tool of claim 4, wherein the selected location is about 27 inches from the transmitter antenna.

6. The well logging tool of claim 1, wherein the second receiver antenna is spaced apart from the transmitter antenna at about 22 inches.

7. The well logging tool of claim 6, further comprising a second bucking coil disposed at a selected location between the transmitter antenna and the second receiver antenna.

8. The well logging tool of claim 7, wherein the selected location is about 16 inches from the transmitter antenna.

9. The well logging tool of claim 1, further comprising a third receiver antenna in the induction array stack, wherein the third receiver antenna is disposed between the transmitter antenna and the second receiver antenna at about 12 inches from the transmitter antenna.

10. The well logging tool of claim 9, further comprising a third bucking coil disposed at a selected location between the transmitter antenna and the third receiver antenna.

11. The well logging tool of claim 10, wherein the selected location is about 9 inches from the transmitter antenna.

12. The well logging tool of claim 1, wherein the mandrel is conductive.

13. The well logging tool of claim 1, wherein the shallow electrode array comprises:
    a central electrode;
    a first pair of measurement electrodes disposed at a substantially equal distance on both sides of the central electrode along the longitudinal axis of the well logging tool;
    a second pair of measurement electrodes disposed at a substantially equal distance on both sides of the central electrode along the longitudinal axis of the well logging tool, wherein each of the second pair of the measurement electrodes is disposed between the central electrode and one of the first pair of measurement electrodes;

a pair of return-current electrodes disposed at a substantially equal distance on both sides of the central electrode along the longitudinal axis of the well logging tool, wherein each of the pair of the return-current electrodes is disposed between the central electrode and one of the second pair of measurement electrodes; and a pair of monitor electrodes disposed at a substantially equal distance on both sides of the central electrode along the longitudinal axis of the well logging tool, wherein each of the pair of the monitor electrodes is disposed between the central electrode and one of the pair of return-current electrodes.

14. The well logging tool of claim 13, wherein the housing is no more than 8 feet long.

15. The well logging tool of claim 1, wherein a total length of the well logging tool is no more than 15 feet long.

16. The well logging tool of claim 1, wherein a total length of the well logging tool is no more than 13 feet long.

17. The well logging tool of claim 1, wherein the shallow electrode array and the induction array stack share the electronic module stack.

18. The well logging tool of claim 1, further comprising an electrode disposed on an end of the well logging tool.

19. A method for well lagging using a tool comprising an induction array stack disposed on a mandrel; an electronic module stack disposed adjacent the induction array stack along a longitudinal axis of the well logging tool; and a shallow electrode array arranged on a housing and disposed around the electronic module stack, wherein the induction array stack comprises a transmitter antenna, a first receiver antenna, and a second receiver antenna spaced apart from each other along the longitudinal axis of the well logging toot the second receiver antenna being disposed between the transmitter antenna and the first receiver antenna, the method comprising:

disposing the tool in a wellbore;

acquiring a first resistivity measurement using the first receiver antenna and a second resistivity measurement using the second receiver antenna;

acquiring a shallow resistivity measurement; and processing the first resistivity measurement, the second resistivity measurement, and the shallow resistivity measurement to provide a formation resistivity.

20. The method of claim 19, wherein the shallow resistivity measurement is acquired using the shallow electrode array.

21. The method of claim 19, wherein the shallow resistivity measurement is acquired using a third receiver antenna disposed in the induction array stack.

22. The method of claim 19, wherein the processing comprises correcting for shoulder effects and skin effects.

23. The method of claim 19, wherein the processing comprises resolution enhancement.

* * * * *

UNITED STATES PATENT AND TRADEMARK OFFICE
CERTIFICATE OF CORRECTION

| | | |
|---|---|---|
| PATENT NO. | : 7,042,225 B2 | Page 1 of 1 |
| APPLICATION NO. | : 10/707424 | |
| DATED | : May 9, 2006 | |
| INVENTOR(S) | : Thomas D. Barber | |

It is certified that error appears in the above-identified patent and that said Letters Patent is hereby corrected as shown below:

Please change claim 1, from ranged to arranged.

Signed and Sealed this

Fifteenth Day of August, 2006

JON W. DUDAS
*Director of the United States Patent and Trademark Office*